March 26, 1940.  W. KUNSTORFF  2,194,946
STEAM TRAP
Filed June 10, 1938
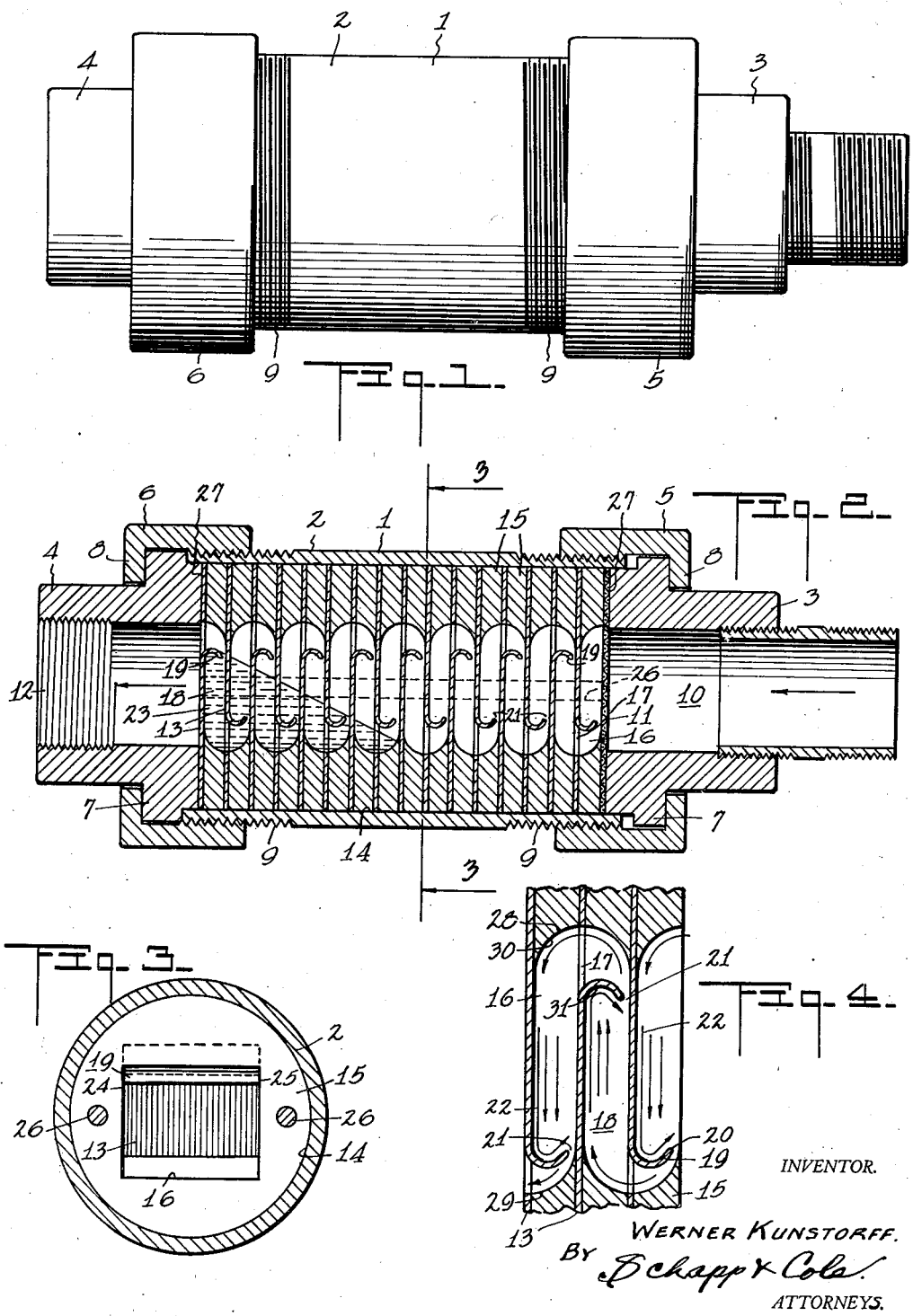
INVENTOR.
WERNER KUNSTORFF.
BY Schapp & Cole
ATTORNEYS.

Patented Mar. 26, 1940

2,194,946

UNITED STATES PATENT OFFICE 2,194,946

STEAM TRAP

Werner Kunstorff, San Francisco, Calif.

Application June 10, 1938, Serial No. 212,999

13 Claims. (Cl. 137—103)

The present invention relates to improvements in steam traps and has particular reference to a device of the character described that is adapted to be connected into a steam line for conserving the steam and thus allow the maximum amount of heat or energy to be obtained from the steam.

It is proposed to provide a steam trap which has no moving parts as compared with the conventional steam traps, as for instance, the float, bucket, bowl, expansion and differential traps.

It is further proposed to provide a steam trap which may be mounted horizontally, vertically or at different degrees of angularity, the one trap being made for use in any of these positions without requiring alteration in the trap.

A still further object of my invention resides in utilizing the steam flowing into the trap for impeding or choking forward steam flow. More particularly I propose to deflect a portion of the steam advancing through the trap into the path of the other steam, thus retarding the steam flow and permitting the full benefit to be derived from the steam.

It is further proposed to provide a steam trap that is continuous in operation in contradistinction with steam traps of the intermittent type.

Another object of my invention is to provide a steam trap for turning the steam flowing therethrough back upon itself at successive intervals, each time impeding the forward steam flow.

Moreover, I propose to provide a steam trap that is simple in construction, durable and efficient for the purposes intended and which may be manufactured at a relatively low cost.

Other objects and advantages will appear as the specification proceeds and the novel features will be particularly set forth in the appended claims.

For a better understanding of my invention reference should be had to the accompanying drawing, forming part of this application, in which Figure 1 is an exterior view of a steam trap constructed in accordance with my invention;

Figure 2 a longitudinal section therethrough;

Figure 3 a transverse sectional view taken along the line 3—3 of Figure 2; and

Figure 4 an enlarged fragmentary view of a portion of Figure 2 and illustrating the principle of my steam trap.

While I have shown only the preferred form of my invention I wish to have it understood that various changes or modifications may be made within the scope of the appended claims without departing from the spirit of the invention.

In carrying my invention into practice I provide a steam trap 1, and include in its structural features an elongated cylindrical housing 2 that is adapted to be coupled into a steam line, such as in the outlet leading from a steam radiator, or in any other place wherein a steam trap is employed.

For the purpose of connecting the trap into a steam line I make use of internally threaded sleeves 3 and 4, which are secured upon opposite ends of the housing 2 by a second pair of sleeves 5 and 6, respectively. The sleeves 3 and 4 are fashioned with external flanges 7, while the sleeves 5 and 6 are formed with internal flanges 8. The sleeves 5 and 6 are threaded, as at 9, upon the ends of the housing 2 and upon tightening these sleeves the external flanges 7 are drawn toward ends of the housing 2 in the manner illustrated in Figure 2.

The steam and condensation flowing from a radiator, for example, are conveyed through an opening 10 into the housing. A dirt catcher or strainer 11 is placed over the opening 10 to prevent scale and other foreign matter from entering the trap. After passing through the steam trap, the products of condensation are finally discharged from the outlet end 12, which may lead back to the boiler or to any other desired place.

It will be noted from Figure 2 that a series of partitions 13 are arranged transversely across the bore 14 of the housing 2. These partitions are held in spaced relation with respect to each other by interposed spacers 15, the latter having openings 16 therein communicating with openings 17 formed in the partitions.

The openings 16 and 17 and the partitions and spacers cooperate in forming a tortuous or serpentine passage-way 18 extending between the sleeves 3 and 4, which winds back and forth on first one side of the longitudinal axis of the steam trap and then on the other.

The partitions 13 have deflectors 19 struck up therefrom which project into openings 16 of the spacers. The tip 20 of each deflector is slightly spaced from the adjacent partition to provide narrow slits 21. The deflectors 19 are shaped to deflect a portion of the steam 22 (see arrows in Figure 4) advancing through the passage-way into the path of the steam moving toward the slits 21 to progressively impede the steam flow.

This retarding of the flow of steam results in retaining the live steam in the radiator, or the like, as long as possible and the products of condensation 23 are finally discharged through the outlet 12.

It will be seen from Figure 3 that the openings 16 are polygonal in outline and that the deflectors 19 extend between two opposing walls 24 and 25 of the openings to retain the partitions from turning relative to the spacers. Rods 26 extend through registering openings formed in the partitions and the spacers, and the ends of these rods bear upon the inner confronting faces 27 of the sleeves 3 and 4. The rods 26 hold the partitions and spacers in a unit and the latter may be withdrawn from the housing by removing the sleeves 3 and 5 or the sleeves 4 and 6.

The walls 28 and 29 of the openings 16 in each spacer 15 curve in opposite directions (see Figure 4). Adjacent spacers define curved wall sections 30 that form part of the tortuous passageway 18.

From the foregoing description of the various parts of my steam trap the operation thereof may be readily understood.

Assuming that the steam trap is connected into a high pressure steam line, the steam and condensation will enter the trap and pass through the screen 11. As the steam strikes against the inner curved faces 31 of the deflectors 19 a portion of the steam will be directed into the path of the steam flowing toward the slits 21.

Part of the steam is turned back upon itself and impedes the steam flow, thus preventing the free flow of steam through the trap.

However, a portion of the steam will escape through the narrow slits 21 and as the steam flows downwardly between two adjacent partitions 13 the pressure acts upon the surface of any condensation that may be present in the passageway 18 and results in forcing the condensation or water along the passageway for final discharge at the trap outlet 12.

The turning back of the steam upon itself is repeated at successive intervals, and the live steam is trapped against free escape.

In certain installations the outlet 12 may be connected to a suction pump to aid in drawing the condensation through the steam trap. I do not wish to be limited to any particular type of installation, since my steam trap is intended for universal use.

My steam trap may be easily cleaned by introducing steam or other fluid through the end 12, which will force foreign matter out of the trap. It will be noted that the deflectors 19 will not interfere with this cleaning operation.

I claim:

1. In a steam trap, a conduit having a serpentine steam passageway leading therethrough, and a deflector in said passageway forming a narrow slit with the passageway wall, the deflector being arranged to deflect a portion of the steam advancing through the passageway into the path of steam moving toward the slit.

2. In a steam trap, a conduit having a serpentine steam passageway leading therethrough, and deflectors arranged at successive intervals in said passageway and forming narrow slits with the passageway walls, the deflectors being arranged to deflect a portion of the steam advancing through the passageway into the path of the steam moving toward the slits to progressively impede the steam flow.

3. In a steam trap, a conduit having a series of separable and interchangeable elements arranged therein in successive order to provide a tortuous steam passageway including restricted steam openings, and means adjacent said openings for diverting a portion of the steam advancing through the passageway to impinge upon steam approaching the openings.

4. In a steam trap, an elongated housing, means for coupling the ends of the housing into a steam line, and a series of spaced partitions mounted transversely across the housing, each partition having an opening therein and a deflector extending toward one of the adjacent partitions with the tip of the deflector slightly spaced from the latter partition, said openings and deflectors of adjacent partitions being arranged on opposite sides of the longitudinal axis of the housing.

5. In a steam trap, an elongated housing, means for coupling the ends of the housing into a steam line, a series of spacers mounted transversely across the housing, each spacer having an opening therein, and an apertured partition interposed between each adjacent set of spacers and having a deflector extending into the opening in a spacer toward one of the adjacent partitions.

6. In a steam trap, an elongated housing, means for coupling the ends of the housing into a steam line, a series of spacers mounted transversely across the housing, each spacer having an opening therein, and an apertured partition interposed between each adjacent set of spacers and having a deflector extending into the opening in a spacer toward one of the adjacent partitions and means for retaining the spacers and partitions from turning with respect to each other.

7. In a steam trap, a spacer and a partition abutting one face of the spacer, the partition and the spacer having communicating openings, the partition having a deflector extending into the spacer opening with the tip of the deflector spaced from the opposite face of the spacer.

8. In a steam trap, a spacer and a partition abutting one face of the spacer, the partition and the spacer having communicating openings, the partition having a deflector extending into the spacer opening with the tip of the deflector spaced from the opposite face of the spacer and means for retaining the partition and the spacer against turning movement with respect to each other.

9. In a device of the character described, a spacer having a rectangular opening therein, two opposite walls of the opening being curved transversely to the opening to present sloping surfaces facing in opposite directions.

10. In a device of the character described, a circular disc having an elongated slit running parallel to a diameter and in spaced relation thereto, the slit forming a passageway through the disc, and a deflecting tongue projecting from the inner margin of the slit to form a reverse curve with the disc, the tongue being disposed to deflect fluid passing through the slit, and the section of the disc underneath the overlying tongue being solid to form a barrier for the fluid.

11. In a steam trap, a cylindrical housing, a plurality of elements separably and interchangeably arranged in the housing in successive order to form a serpentine conduit winding back and forth on first one side of the longitudinal axis of the housing and then on the other, means engaging the ends of the housing for urging the elements into a compact unit, and inlet and outlet sleeves arranged axially of the housing and communicating with the serpentine conduit, the sleeves being made to be coupled into a steam line or the like.

12. In a steam trap, an elongated housing, a series of parallel spacers mounted transversely across the chamber of the housing, each spacer having an opening therein, an apertured partition interposed between each adjacent set of spacers and having a deflector extending into the opening in a spacer toward one of the adjacent partitions, the assembled spacers and partitions forming a unit having parallel oppositely disposed ends, a pair of sleeves formed with flat confronting faces abutting said parallel ends of said unit, the sleeves being adapted to be connected into a steam line or the like, and means for securing the sleeves to the ends of the housing.

13. In a steam trap, an elongated housing, a series of parallel spacers mounted transversely across the chamber of the housing, each spacer having an opening therein, an apertured partition interposed between each adjacent set of spacers and having a deflector extending into the opening in a spacer toward one of the adjacent partitions, the assembled spacers and partitions forming a unit having parallel oppositely disposed ends, a pair of sleeves formed with flat confronting faces abutting said parallel ends of said unit, the sleeves being adapted to be connected into a steam line or the like, means for securing the sleeves to the ends of the housing, and rods passing through alined openings in the assembled spacers and partitions for retaining the spacers and partitions from turning with respect to each other, the ends of the rods bearing against said flat confronting faces of the sleeves.

WERNER KUNSTORFF.